UNITED STATES PATENT OFFICE.

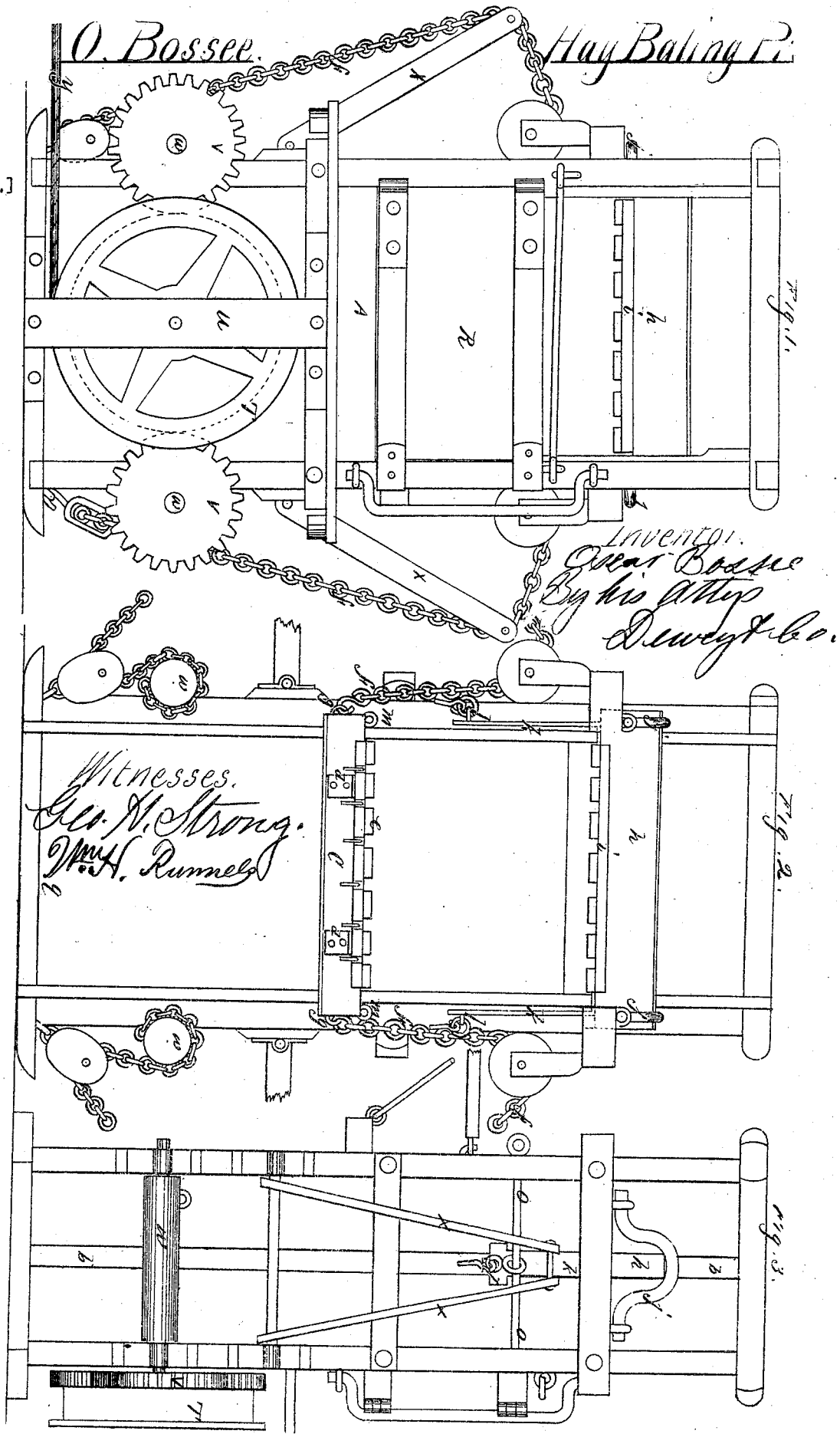

OSCAR BOSSEÉ, OF MILLBRAE, CALIFORNIA.

IMPROVEMENT IN HAY-PRESSES.

Specification forming part of Letters Patent No. 118,582, dated August 29, 1871.

*To all whom it may concern:*

Be it known that I, OSCAR BOSSEÉ, of Millbrae, county of San Mateo, State of California, have invented an Improved Hay-Press; and I do hereby declare the following description and accompanying drawing are sufficient to enable any person skilled in the art or science to which it most nearly appertains to make and use my said invention or improvements without further invention or experiment.

My invention relates to certain new and useful improvements in upright hay-presses, whereby a greater capacity is obtain for doing the work speedily and with less labor than the ordinary hay-press affords.

In order to explain my invention so that others will be able to understand its construction and operation, reference is had to the accompanying drawing forming a part of this specification, in which—

A represents the upright box in which the hay is placed in order to be pressed. The frame-work of this box extends upward above the height of the sides, and the sides at the upper end are left open, as shown. Vertical slots $b$ are left in the opposite ends of the box, which serve to guide the follower. The follower consists of a rail, C, having side lugs upon which the pressing-rack $e$ is placed. The follower has its opposite ends fitted in the slot $b$ at the bottom of the box, and the rack $e$ is placed upon it. The side chains $f$ are then attached to loops $g$ on the ends of the rail C, ready to be drawn up. The hay or other substance to be pressed is then pitched into the box at its upper or open end until the box contains a sufficient quantity to form a bale, after which a rail, $h$, similar to C, which has a rack, $i$, similar to $e$, fixed to its under side, is secured across the upper open end of the box by means of curved bars $j$, which are hinged to the outside of the box so as to be turned to a vertical position and lock the bar in place. Projecting downward from each end of the rail $h$, on the outside of the box, is a strong metal bar or plate, $k$, to the lower end of which is fixed a hook, $l$. The upper rack $i$ being fixed in place, the follower is drawn up with its load of hay by means hereinafter described, until the bale is pressed between the two racks $e$ and $i$. The hooks $l$ are then hooked into eyebolts $m$ on the upper side of the follower C, which binds the two racks in place, holding the bale between them. The curved bars $j$ are then thrown off the ends of the rail $h$, and the whole bale, with its clamping-racks, is drawn up to the top of the frame clear of the box, and held by long bolts $o$ which pass through the frame directly below the lower follower. While held in this position the bale is bound and fastened in the usual manner, after which it is released and removed through the open side. When the bale has been fixed ready to bind the side chains $f$ are released from the follower C and lowered to the bottom, where it is attached to a duplicate of the follower C, which has been placed in position through the opening $q$ at the bottom of the press. The door R, which forms a portion of one side of the box, is then opened, and while the pressed bale is being bound and tied other parties can be engaged in filling the box with hay ready to be pressed in the same manner as above described. A large wheel, T, is arranged to be revolved close against one side of the box in a plane parallel with its shaft, bearing at one end in the side of the box and at the other in a vertical post, $u$. The inner portion of the rim of this wheel is toothed, while the outer portion forms a pulley, as shown. The teeth of this wheel gears with toothed wheels V, which are secured to the end of the shafts $w$, around which the chains are wound in order to raise the levers X. A rope or chain, $y$, passes around the pulley-rim of the wheel V, to the end of which the horse is hitched, so as to turn the wheel by drawing upon the rope or chain, thus turning the drums W and raising or lowering the follower, as the case may be.

By thus constructing a hay-press the work can be carried on with great facility, and with less labor than it requires with other machines used for the same purpose.

Having thus described my invention, what I claim and desire to secure by Letters Patent, is—

1. The rail C provided with lugs $d$ and side loops $g$ and the rack $e$, in combination with the side chains $f$, the rail $h$, and the rack $i$, all constructed and arranged with reference to a hay-press, substantially as and for the purpose set forth.

2. The rail $h$ with its downwardly projecting plates $k$, the said plates being provided with a hook, $l$, in combination with the racks $i$ and $e$, and the rail C having the eyebolts *m*, all constructed and arranged substantially as and for the purpose set forth.

3. The curved bars or locks *j*, in combination with the rails C and *h*, and the plates *k* provided with the hooks *l*, substantially as and for the purpose set forth.

4. The hay-press herein described, and consisting of the frame and box A, door R, side slots *b*, rails C and *h*, racks *e* and *i*, side bars *k*, side chains *f*, the wheel T, and toothed-wheels V, all constructed, arranged, and operating substantially as and for the purpose set forth.

In witness that the above-described invention is claimed by me I have hereunto set my hand and seal.

OSCAR BOSSEÉ. [L. S.]

Witnesses:
 E. N. SUTTER,
 GEO. H. STRONG.